United States Patent [19]

Ohkawa

[11] 4,305,784

[45] Dec. 15, 1981

[54] TOKAMAK WITH MECHANICAL COMPRESSION OF TOROIDAL MAGNETIC FIELD

[75] Inventor: Tihiro Ohkawa, La Jolla, Calif.

[73] Assignee: The United States of America as represented by the United States Department of Energy, Washington, D.C.

[21] Appl. No.: 15,964

[22] Filed: Feb. 28, 1979

Related U.S. Application Data

[63] Continuation-in-part of Ser. No. 768,263, Feb. 14, 1977, Pat. No. 4,269,658, which is a continuation-in-part of Ser. No. 622,089, Oct. 14, 1975, abandoned, which is a continuation-in-part of Ser. No. 375,341, Jul. 2, 1973, abandoned.

[51] Int. Cl.³ .................................................. G21B 1/00
[52] U.S. Cl. ..................................... 376/125; 376/133
[58] Field of Search ............................... 176/1, 3, 6-9

[56] References Cited

U.S. PATENT DOCUMENTS

| | | | |
|---|---|---|---|
| 3,037,921 | 6/1962 | Tuck | 176/3 |
| 3,708,391 | 1/1973 | Christofilos | 176/7 |
| 4,000,036 | 12/1976 | Ensley | 176/3 |

FOREIGN PATENT DOCUMENTS 855859 12/1960 United Kingdom .................... 176/9

OTHER PUBLICATIONS

ORNL-TM 3096, 5/73, Fraas, pp. 1, 10-30.
Proc. of the High Beta Workshop, 1975 Robson et al, pp. 60-70.
Physical Review, vol. 29, pp. 1495-1498, 11/72.
GA-A12441, 5/73, Ohkawa.
Plasma Physics & Controlled Nuclear Fusion Research 1976, vol. III, pp. 507-516.

Primary Examiner—Harvey E. Behrend

[57] ABSTRACT

A tokamak apparatus includes a pressure vessel for defining a reservoir and confining liquid therein. A collapsible toroidal liner disposed within the pressure vessel defines a toroidal space within the liner. Liquid metal fills the reservoir outside said liner. A toroidal magnetic field is developed within the toroidal space about the major axis thereof. A toroidal plasma is developed within the toroidal space about the major axis thereof. Pressure is applied to the liquid metal to collapse the liner and reduce the volume of the toroidal space, thereby increasing the toroidal magnetic flux density therein.

10 Claims, 4 Drawing Figures

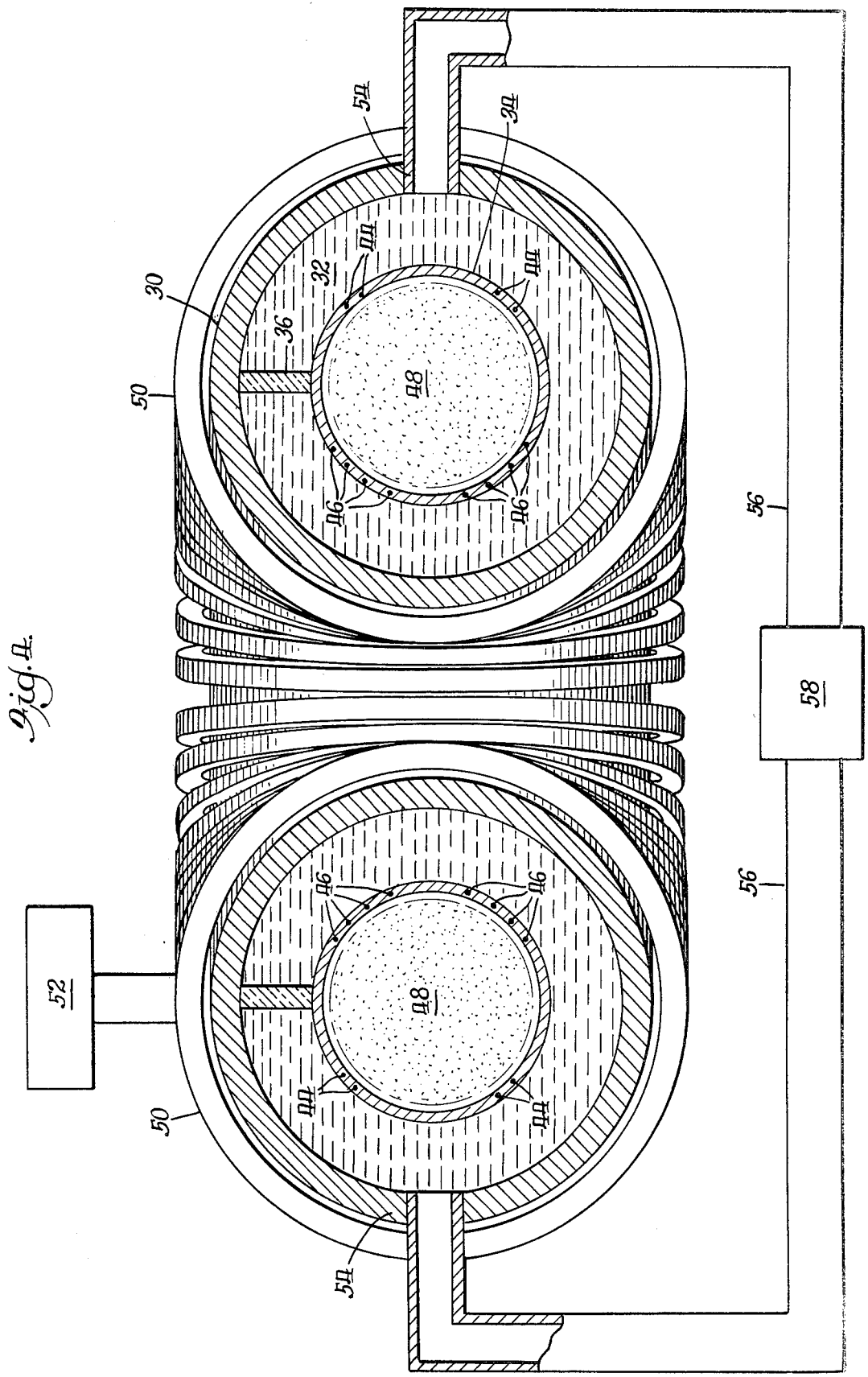

TOKAMAK WITH MECHANICAL COMPRESSION OF TOROIDAL MAGNETIC FIELD

This application is a continuation-in-part of copending application Ser. No. 768,263, filed Feb. 14, 1977, now issued as U.S. Pat. No. 4,269,658 on May 26, 1981, to General Atomic Company as assignee, which in turn was a continuation-in-part of application Ser. No. 622,089, filed Oct. 14, 1975, which was copending therewith and is now abandoned and which in turn was a continuation-in-part of application Ser. No. 375,341, filed July 2, 1973, which was copending therewith and is now abandoned.

This invention relates generally to plasma devices, particularly such devices of the tokamak type. More particularly, the present invention relates to the generation of toroidal magnetic fields in such devices utilizing mechanical compression to increase the toroidal magnetic flux density.

Tokamak devices are devices in which plasma is created in a toroidal space and is confined therein by an appropriate combination of toroidal and poloidal magnetic fields. Such devices are useful in the study and analysis of plasmas, and particularly in the generation, confinement, study and analysis of hydrogenic plasmas. Such devices are among the most useful of known plasma devices for the reaction of deuterium and tritium with the production of high energy neutrons as reaction products. The present invention finds particular utility in respect to such devices and their applications, including experimental devices and the use thereof in experimentation and investigation in respect to toroidal plasma devices of the tokamak type.

In tokamak devices, gases are disposed in a toroidal confinement vessel. The gases are ionized to produce a plasma that is heated and confined by appropriate magnetic and electrical fields. The principal field is a toroidal magnetic field conventionally created by electrical coils linking the torus. In accordance with the present invention, the toroidal magnetic flux density is increased by the mechanical compression of the confinement vessel.

In the aforementioned prior applications, plasma devices were described in which the vessel confining the plasma was formed of liquid metal which was squeezed to reduce the plasma region, thereby increasing the toroidal magnetic flux density in the plasma and hence constricting the plasma itself. In certain forms of such plasma devices, particularly as shown in the drawings of these prior applications, the confining wall was formed by rotating the liquid so that the wall was formed by centrifugal force. As there stated, there are difficulties in the stabilization of a liquid liner in toroidal systems. A solid liner is therefore preferable for toroidal plasma systems, such as tokamak devices.

Thus, a primary object of the present invention is to provide a tokamak apparatus including a toroidal liner for confining a toroidal plasma, which liner is compressible to increase the density of the magnetic flux through the toroidal plasma. Other objects and advantages of the invention will become apparent from the following detailed description, particularly when taken in conjunction with the accompanying drawings in which:

FIG. 4 is an illustration, partly diagrammatic and partly in axial section, of a tokamak device utilizing the present invention for enhancing the toroidal magnetic field.

One of the more difficult aspects of high temperature plasma devices is the confinement of the plasma, which is ionized gas. This can be accomplished by the now well-known tokamak device. It has a toroidal containment vessel for containing the gas and the plasma. Twisting magnetic fields are created within the toroidal vessel to confine the plasma and keep it from striking the walls of the toroidal vessel. These fields include toroidal and poloidal components as produced by the flow of electric current. The manner of creating such fields is illustrated conceptually in FIGS. 1 and 2, and a generalized and simplified form of tokamak device is illustrated in FIG. 3.

Figure 1:
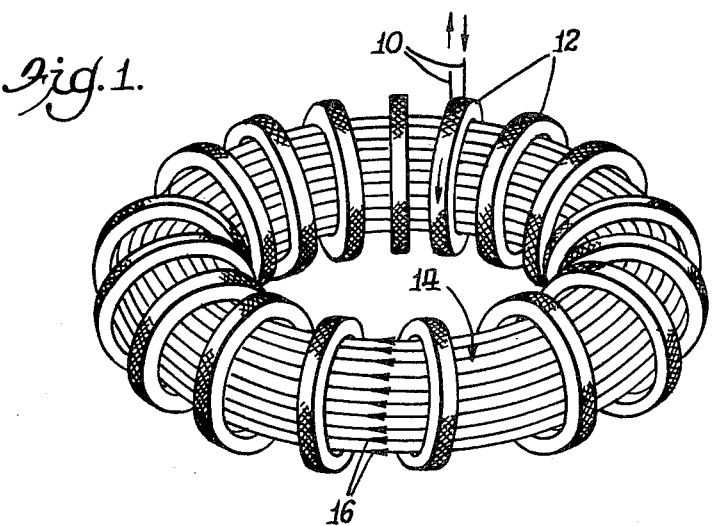
FIG. 1 is a stylized illustration of the manner of producing a toroidal magnetic field in a tokamak device.

In FIG. 1 is illustrated means for producing the toroidal magnetic field component. Electrical current is applied over conductors 10 to toroidal field coils 12. The current in these coils links a toroidal space 14 and hence generates a toroidal magnetic field 16 therein, as indicated by the arrows.

Figure 2:
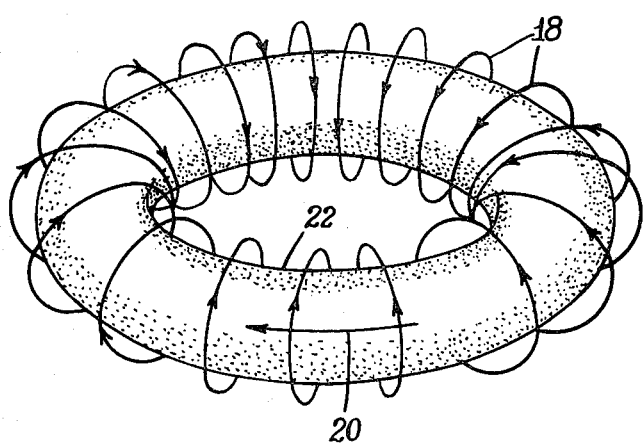
FIG. 2 is a stylized illustration of the manner of producing a poloidal magnetic field in a tokamak device.

In FIG. 2 is illustrated means for producing the principal poloidal magnetic field component that is necessary for stable confinement. In this device the poloidal field 18, as indicated by the arrows, is induced by toroidal current 20 in the plasma 22. In practice electric current in equilibrium field coils outside the torus generates an additional poloidal magnetic field which modifies the principal poloidal field to control the position of the plasma.

Figure 3:
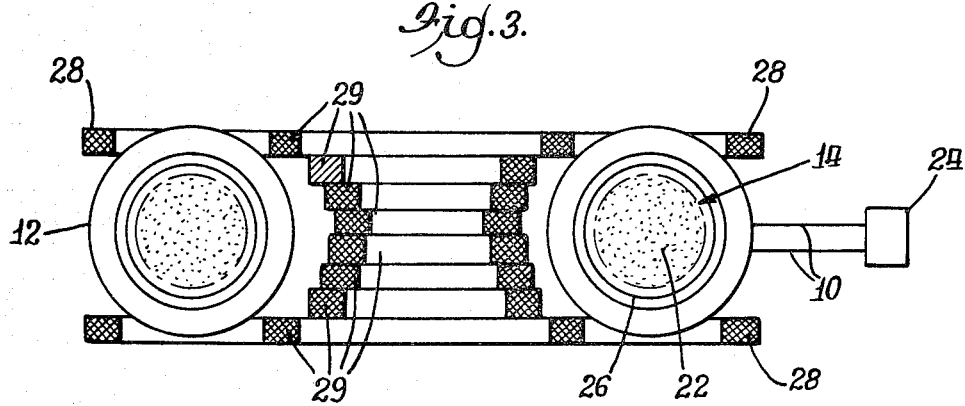
FIG. 3 is a stylized illustration of a conventional tokamak device.

As generalized, a conventional tokamak device, as illustrated in FIG. 3, combines the features of FIGS. 1 and 2 to provide a high level of plasma stability. As there illustrated, current from a power source 24 is applied over the conductors 10 to the toroidal field coils 12 which are disposed around a toroidal liner 26 which contains and defines the toroidal space 14 in which the plasma 22 is created. Equilibrium field coils 28 are supplied with electrical current from a source not illustrated to position the plasma 22 within the liner 26. Ohmic heating coils 29, also supplied with electrical current from a source not illustrated, induce current in the plasma 22 to ionize the gas, heat the plasma, and generate the poloidal magnetic field illustrated in FIG. 2.

In FIG. 4 is illustrated a preferred form of the invention for enhancing the toroidal magnetic field. It is thus a form of the device shown in stylized form in FIG. 1. In this preferred embodiment of the present invention, a pressure vessel 30 forms a reservoir filled with liquid metal 32. A toroidal liner 34 is supported within the liquid metal 32 by struts 36 extending to the vessel 30. The pressure vessel 30 is formed of material, such as stainless steel, capable of withstanding relatively high internal pressure while not being attacked by the environment, notably the liquid metal 32. While various other metals are effective for certain purposes, liquid lithium is preferred for the liquid metal 32, particularly for deuterium-tritium plasma devices, for lithium is suitable for moderating resultant neutrons and acts to breed tritium fuel by reaction with the neutrons:

$$_3Li^6 + _0n^1 \rightarrow {_1H^3} + {_2He^4}.$$

The liquid metal may also act as a coolant. The toroidal liner 34 may have equilibrium field coils 44 and ohmic heating coils 46 embedded therein to provide an appropriate poloidal magnetic field and appropriate ohmic heating in the usual fashion. Alternatively these coils 44 and 46 may be supported outside the liner.

The toroidal liner 34 defines a toroidal space 48 in which gas is confined for producing plasma. The liner 34 separates the liquid metal 32 from the toroidal space 48 and thus forms a bubble of gas in a pool of liquid. The ohmic heating coils 46 are energized in a conventional manner to ionize the gas and produce the plasma. The plasma is positioned by the action of the poloidal magnetic field and is confined by a toroidal magnetic field produced by current passed through a toroidal field coil 50 from a power supply 52.

The creation of the toroidal magnetic field by the toroidal field coil 50 is achieved in a conventional manner. However, in accordance with the present invention, the toroidal magnetic field within the toroidal space 48 is enhanced by the mechanical compression of the toroidal liner 34 to reduce the size of the space 48. To permit the compression of the liner 34, the liner is made collapsible. More specifically, it is made of such configuration and materials as to result in the relatively uniform collapse of the liner upon the application of relatively uniform pressure to its exterior.

In one form of the invention, the liner is formed of relatively soft metal, such as solid lithium. The liner 34 is collapsed by applying pressure uniformly around its circumference by way of the liquid metal 32. Pressure in the liquid metal 32 is developed by forcing additional liquid metal through inlet orifices 54 disposed equatorially around the pressure vessel 30. The liquid metal is supplied through supply conduits 56 from a supply source 58. The supply source 58 may provide a driving pressure in a number of ways, as pneumatically, hydraulically, or mechanically. Further, the supply source may take the form of pressure drives adjacent respective orifices 54.

In operation of the tokamak device illustrated, the power supply 52 supplies current to the toroidal field coil 50 to produce a toroidal magnetic field inside the pressure vessel 30, including both the liquid metal 32 and the toroidal space 48. Current is then applied through the ohmic heating coils 46 to produce plasma current in the toroidal region 48 in the usual manner. Current applied to the equilibrium field coils 44 positions the plasma in the usual manner. Then the supply source 58 is rendered operative to produce a sharp pressure pulse in the liquid metal 32, forcing additional metal into the pressure vessel 30 and collapsing the liner 34 relatively uniformly about the toroidal space 48. The rate at which liquid metal 32 is supplied to the liner 30 is sufficient to collapse the liner at a rate fast relative to the skin time of the generation of currents in the collapsing liner. That is, the liner 34 is collapsed at a rate sufficient to preclude the escape of any substantial amount of magnetic flux before the desired reaction has occurred. When the collapse is fast relative to skin time, the effect is to retain substantially the same total flux within the space 48 and hence increase the flux density within the space 48. The increased flux density results in concentration of the plasma along the concentrated lines of flux, thereby increasing the probability of reaction within the space 48. The pressure supplied by the supply source 58 may be tailored to obtain the desired compression speed.

There is an additional effect that is worthy of mention. As is well-known, the toroidal magnetic flux within a toroidal coil is greater near the major axis of the coil. In fact, flux density varies inversely with distance from the major axis. The result of this is that, when the liner 34 is collapsed, an inverse hoop force is created that reduces the major radius of the toroidal space 48, and draws the toroidal space toward its major axis.

It may be noted that when the embodiment of the present invention illustrated is utilized, the liner is destroyed with each operation. The liner must therefore be reconstituted or replaced before each operation. Further, where the liner is formed of solid lithium in contact with liquid lithium, there is an inherent phase instability, making it desirable and usually necessary to operate the device relatively promptly after assembly, while the liner remains in its initial condition.

Of course, many modifications of the device may be made within the scope of the present invention. The liner may be fabricated differently and of different materials. The collapsing pressure may be applied in a different manner. The toroidal magnetic field may be applied in a number of well-known ways, as may the ohmic heating and equilibrium fields. The plasma may be created and the plasma current caused to flow in a number of well-known ways. It should also be noted that details of well-known components of tokamak devices have been omitted from the drawings in order that the essential parts of the invention may be more easily shown and understood.

The present invention is directed to increasing toroidal magnetic flux density in the plasma by relatively rapidly reducing the plasma volume containing toroidal magnetic flux. The present invention provides a relatively high flux density with a relatively small device. The smaller size of the device results in lower cost, and the higher flux density confines the plasma to a smaller volume, increasing the interaction between the plasma particles.

I claim:

1. Tokamak apparatus comprising:
   a pressure vessel for defining a reservoir and confining liquid therein under pressure,
   a collapsible toroidal liner disposed within said pressure vessel for defining a toroidal space within said liner,
   liquid metal filling said reservoir outside of and completely surrounding said liner,
   means for developing a toroidal magnetic field within said toroidal space about the major axis thereof,
   means for developing a toroidal plasma within said toroidal space about the major axis thereof, and
   means for applying pressure to said liquid metal to collapse said liner and reduce the volume of said toroidal space.

2. Apparatus according to claim 1 wherein said means for applying pressure comprises means for adding liquid metal to said reservoir.

3. Apparatus according to either one of claims 1 and 2 wherein said liquid metal is lithium.

4. Apparatus according to either one of claims 1 and 2 wherein said means for developing a toroidal plasma includes ohmic heating coils.

5. Apparatus according to claim 4 wherein said ohmic heating coils are carried by said toroidal liner.

6. Apparatus according to claim 5 further including equilibrium field coils for positioning said toroidal plasma.

7. Apparatus according to claim 6 wherein said equilibrium field coils are carried by said toroidal liner.

8. A method of operating a tokamak device comprising:

establishing a toroidal space defined by a collapsible toroidal liner in a pool of liquid metal said liquid metal completely surrounding said liner, establishing a toroidal magnetic field within said toroidal space about the major axis thereof, establishing a toroidal plasma within said toroidal space about the major axis thereof, and applying pressure to said liquid metal to reduce the volume of said toroidal space and thereby increase the toroidal magnetic flux density therein.

9. A method according to claim 8 wherein said pool of liquid metal is confined in a pressure vessel and said pressure is applied by adding liquid metal to said pool.

10. A method according to either one of claims 8 and 9 wherein the applied pressure reduces the volume in a time short relative to skin time in the composite toroidal liner disposed about said liquid metal system toroidal space.

* * * * *